Aug. 18, 1925.
C. V. McCARLEY
1,549,781
LIGHT DEFLECTOR FOR AUTOMOBILE LAMPS
Filed June 14, 1924
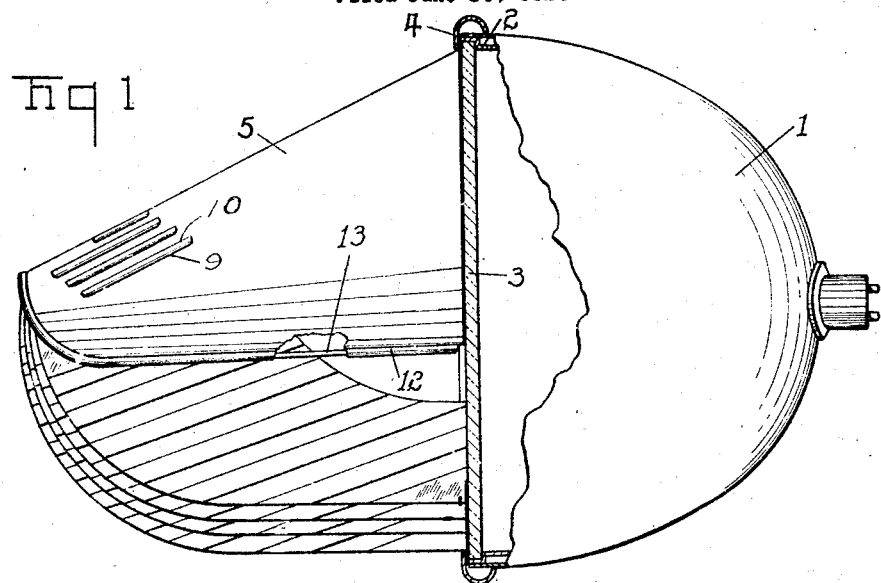
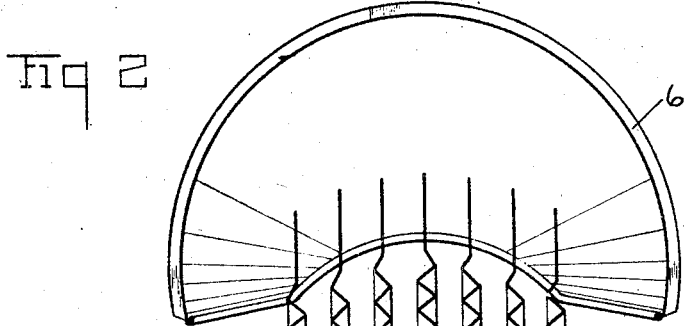
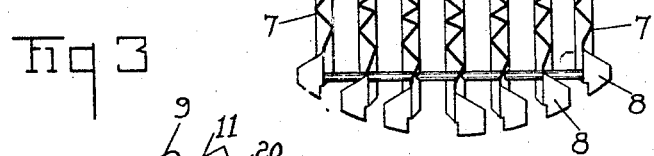
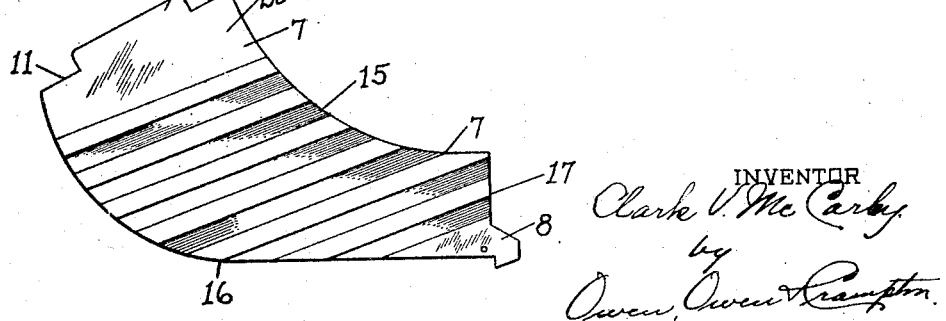
INVENTOR
Clarke V. McCarley
by
Owen, Owen & Crampton Patented Aug. 18, 1925.

1,549,781

UNITED STATES PATENT OFFICE.

CLARK V. McCARLEY, OF McCLURE, OHIO.

LIGHT DEFLECTOR FOR AUTOMOBILE LAMPS.

Application filed June 14, 1924. Serial No. 719,963.

*To all whom it may concern:*

Be it known that I, CLARK V. McCARLEY, a citizen of the United States, and a resident of McClure, in the county of Henry and State of Ohio, have invented a new and useful Light Deflector for Automobile Lamps, which invention is fully set forth in the following specification.

My invention has for its object to provide a means for directing all of the diffused rays of light produceable by a lamp into a restricted area in front of the lamp and thus preventing a blinding effect that commonly occurs in connection with automobile light deflectors that depend upon the refraction of their rays, and also the blinding effects of lamps that depend for their deflection on vizors of different forms, as well as those that depend merely upon the reflector for focusing the rays of light. In the first instance, the blinding effect is substantially the same as though there were no refracting lens, owing to the fact that all glass has its defects and irregularities that produce diffusion of the light, quite as much as the reflector itself, and in the second case, the light reflected from the lower part of the reflector is reflected from irregular surfaces since it is impossible to produce a true reflecting surface without the use of very thorough polishing processes on glassy surfaces. It results in the diffusion of light in either case. In both cases the diffusion of light causes blinding when observed at night by one at some distance in front of the automobile. By my invention the rays of light that are projected straight in front of the automobile are permitted to pass from the lamp and are concentrated by the lens or by the reflector of the lamp to a restricted area well in advance of the automobile while all diffused rays of light, that is, all rays other than those that project themselves substantially parallel to the optical axis of the lamp, are caught and deflected downward, and cover an area that extends but a short distance in front of the automobile. These two sets of rays of light are therefore directed so as to prevent the blinding of one who is located in front of the automobile.

By my invention I provide a vizor that extends well in front of the lamp and deflecting walls arranged in parallel relation below the vizor to gather the diffused rays and direct them to the ground in front of the automobile, the walls however being so located as to permit the rays of light that are projected parallel to the optical axis of the lamp to pass to the restricted area well in advance of the automobile. Thus by my invention is produced a lighted area well in advance of the automobile and a lighted, less restricted, area directly in front of the automobile.

The invention may be contained in lamps that vary in detail and in their form. To illustrate a practical application of the invention I have selected a deflector containing the invention and shall describe it hereinafter. The deflector selected is shown in the accompanying drawings.

Figure 1 of the drawings illustrates a side view of the deflector. Figure 2 illustrates a rear view of the deflector. Figure 3 illustrates one of the deflecting walls shown in Figs. 1 and 2.

The lamp 1 is provided with the usual reflector 2 and lens or transparent plate 3. The lens 3 is secured in position by the ring 4 in the manner well known in the art. The ring 4 is also used for securing the deflector embodying my invention.

The deflector is provided with a vizor 5 that has a flange 6. The flange 6 conforms substantially to the circle of the edge of the lens 3 and is secured between the ring 4 and the lens 3. A plurality of parallel walls 7 located substantially in vertical planes are secured by means of ears 8 that are bent at an angle to the planes of the walls and are cut so that they have portions that will be located beneath the edge of the ring 4 when the deflector is placed in position on the lamp. Thus the ring 4 not only clamps the flange 6 but also portions of the ears 8 at lower corners of the inner ends of the walls 7. The walls 7 are also secured at their outer ends to the outer end of the vizor 5. The walls 7 are provided with flanged portions 9 that may be inserted in slots 10 that are formed in the outer end portion of the vizor 5 and then bent over the outer surface of the vizor 5, the outer ends of the walls being secured to the vizor between the overturned flanged portions and the ends of the walls, particularly along the edge portions 11 that abut the under side of the vizor.

The vizor 5 and the walls 7 are preferably formed of sheet metal. The vizor 5 is provided with a reinforcing bead 12 for reinforcing the edge of the vizor. The edge may be formed by spinning or turning the edge portion over a small wire 13, to reinforce the edge portion of the vizor. The vizor preferably extends to some distance in front of the lens or transparent plate 3 and to a point near the optical axis of the lamp. The circle of the vertical plane located at right angles to the optical axis and described by the forward end of the vizor is much smaller in diameter than the flange 6. Consequently the vizor has the shape of a sector of a frustum of a cone. It thus acts as a deflector to direct all rays of light downward that strikes its inner surface.

The walls 7 are placed in parallel relation and comparatively quite close together. They preferably extend from the face of the lens 3 to the forward end of the vizor and thus they extend quite some distance in front of the lamp. They are provided with an inwardly curved upper edge 15 and an outwardly curved lower edge 16. The width of the end 17 is considerably less than the width of the end having the flanged portion 9, and hence the walls are substantially wedge-shaped with defining curved sides or edges. This leaves a space below the vizor and in front of the lamp, and around the optical axis of the lamp, where the rays of light may cross each other to the walls or the vizor that will as a rule permit larger angles of reflection, and as the rays of light pass along the walls, their angle of incidence will be increased and the diffused light will be either lost between the walls or, if allowed to escape, will do so with at least a large angle of reflection. The walls, however, are preferably provided with angular corrugations that extend in ridges and troughs diagonally downward. This angle with the horizontal is preferably about 20 degrees. Also the corrugations are preferably of considerable depth relative to their width as between the adjoining ridges, and the outer ends of the walls 7 are preferably made plane as at 20. The end portions 20 are located in a zone along the forward edge of the vizor 5, through which the optical axis of the lamp extends. The rays of light that are projected substantially parallel to the optical axis of the lamp will thus readily pass between the walls 7, while all diffused rays will be caught by the corrugated surfaces of the walls and the corrugations extending diagonally downward, such rays of light will be directed to the ground in front of the automobile. This will produce a concentrated light area at a point in front of and well in advance of the automobile, and a light area that is comparatively large in front of but quite close to the automobile, since a large proportion of properly focused rays will immediately pass between the walls of the deflector, while the diffused rays that cause blinding are caught by the walls and the vizor and directed downward.

I claim:—

1. In a deflector for reflector lamps, comprising a vizor and a plurality of parallel walls extending in front of the lamp, the walls having corrugated surfaces.

2. In a deflector for reflector lamps, comprising a vizor and a plurality of parallel walls extending in front of the lamp, the walls having V-shaped corrugations.

3. In a deflector for reflector lamps, comprising a vizor and a plurality of parallel walls extending in front of the lamp, the walls having corrugated surfaces, the corrugations extending diagonally downward from the optical axis of the lamp to direct the diffused rays to a point in front and near to the forward end of the automobile.

4. In a deflector for reflector lamps, comprising a vizor and a plurality of parallel walls extending in front of the lamp, the walls having V-shaped corrugations, the corrugations extending diagonally downward from the optical axis of the lamp to direct the diffused rays to a point in front and near to the forward end of the automobile.

5. In a deflector for reflector lamps, comprising a vizor extending in front of the lens of the lamp, and parallel walls secured to the forward end of the vizor and extending rearwardly to the plane of the rear end of the vizor, the said walls being formed wedge-shaped, having curved side edges.

6. In a deflector for reflector lamps, comprising a vizor extending in front of the lens of the lamp, and parallel walls secured to the forward end of the vizor and extending rearwardly to the plane of the rear end of the vizor, the walls being wedge-shaped, their upper edges being defined by an inverse curve, the lower edges extending to the lower edge of the lens of the lamp.

7. In a deflector for reflector lamps, comprising a vizor extending in front of the lens of the lamp, and parallel walls secured to the forward end of the vizor and extending rearwardly to the plane of the rear end of the vizor, the walls being wedge-shaped, their upper edges being defined by an inverse curve, the lower edges extending to the lower edge of the lens of the lamp.

In testimony whereof, I have hereunto signed my name to this specification.

CLARK V. McCARLEY.